June 11, 1935.

P. H. CRARY 2,004,853

AIR OPERATED POWER UNIT

Filed Nov. 18, 1932

Inventor
Palmer H. Crary
By Lloyd W. Patch
Attorney

June 11, 1935.　　　　P. H. CRARY　　　　2,004,853
AIR OPERATED POWER UNIT
Filed Nov. 18, 1932　　　2 Sheets-Sheet 2
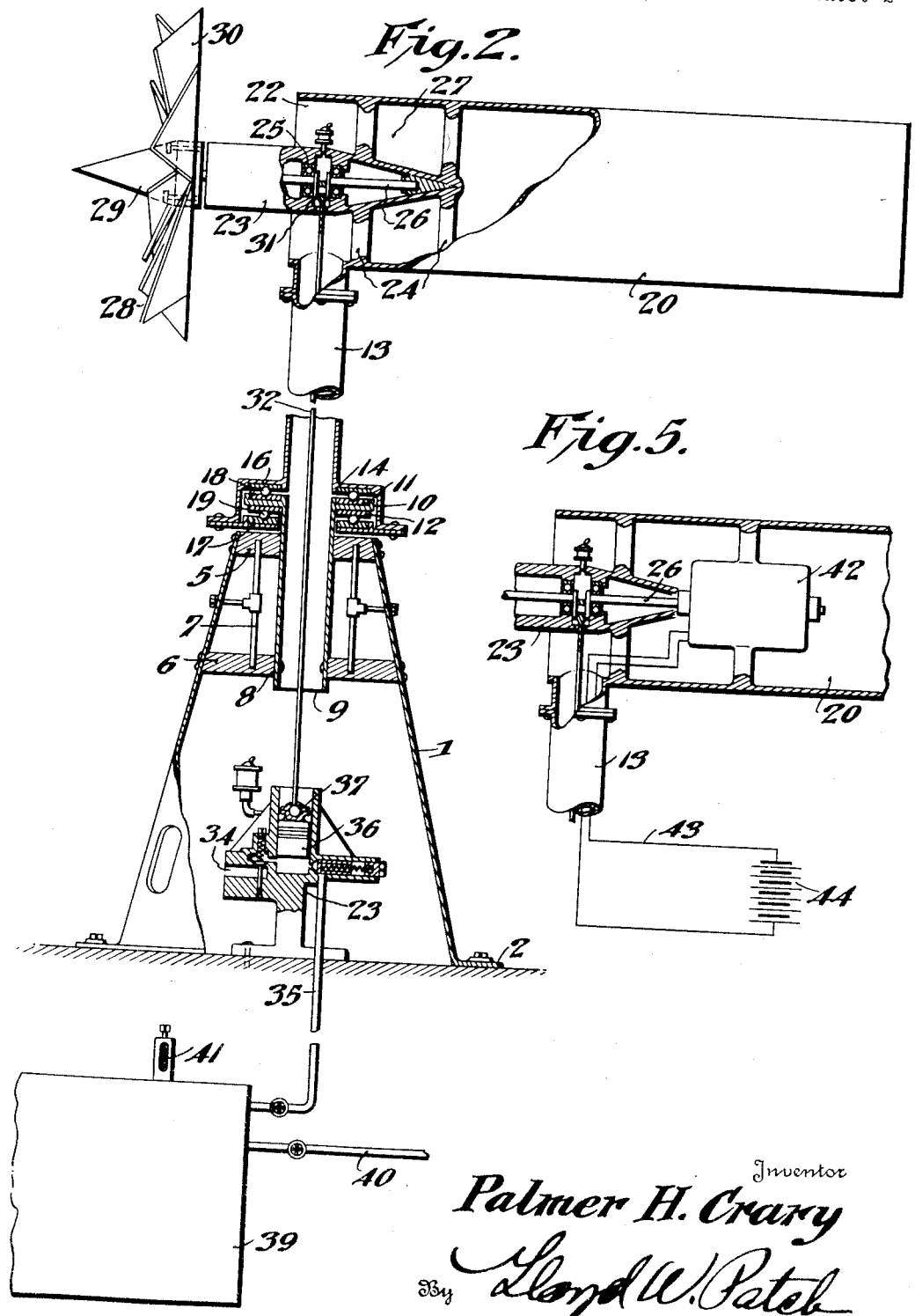

Patented June 11, 1935

2,004,853

UNITED STATES PATENT OFFICE 2,004,853

AIR OPERATED POWER UNIT

Palmer H. Crary, Coconut Grove, Fla., assignor of one-third to William F. A. Buehner, Miami, Fla., and 10 per cent to Robert A. Wright, Rye, N. Y.

Application November 18, 1932, Serial No. 643,264

8 Claims. (Cl. 170—4)

My invention relates to improvements in air operated power units and particularly to a device of this character of the windmill or air wheel type intended and adapted for individual installations.

An object is to provide a device of this character which takes advantage of both air or wind pressure and suction, and thus attains a high degree of efficiency even in a light wind or stirring of the air.

Another object is to so construct and mount the parts that the air or wind wheel will be at all times automatically faced and positioned to operate most efficiently, and that the mounting and power connection portions offer a minimum resistance to such shifting and to the operation of the wheel.

A further object is to provide a supporting structure by which the device can be readily mounted upon the roof of a building; upon a special supporting structure, or in any desired position, and will be substantially self-contained and rigidly supported for efficient operation.

Still another object is to so construct and mount the parts that the air wheel or windmill is turned by both direct pressure force and suction force, a Venturi construction being included to create a suction evacuation on the rear side of the air wheel or windmill to thus quicken and increase the force of air currents driving against the air wheel or windmill.

Still another object is to provide a mechanism that readily adapts itself for association with and connection to electrical units for positive power operation in the absence of sufficient air currents for actuation of the wheel, and for direct operation of electric generating mechanism under air impulse and power.

With the above and other objects in view, which will be apparent to those skilled in the art, my invention includes certain novel features of construction and combinations of parts, which will be hereinafter set forth in connection with the drawings and then pointed out in the claims.

In the drawings:

Fig. 2 is a view in side elevation, with parts in vertical section, to better illustrate the construction and mounting of the parts.

Fig. 5 is a fragmentary view in section illustrating a modified adaptation.

In automobile service stations, and in many other connections, it is desirable to have a supply of air under pressure continuously available. Where electrically operated pump units are employed to compress the air, this means an added expense for electric current; and, in some instances it is not possible or convenient to have power connections for electrical operating means. Further, where electric power connections are available it is often desirable to hold the current consumption down to a minimum, and perhaps to augment the available current supply by generation. My invention readily and admirably adapts itself for use under such conditions, as will more readily appear in the following description.

Figure 1:
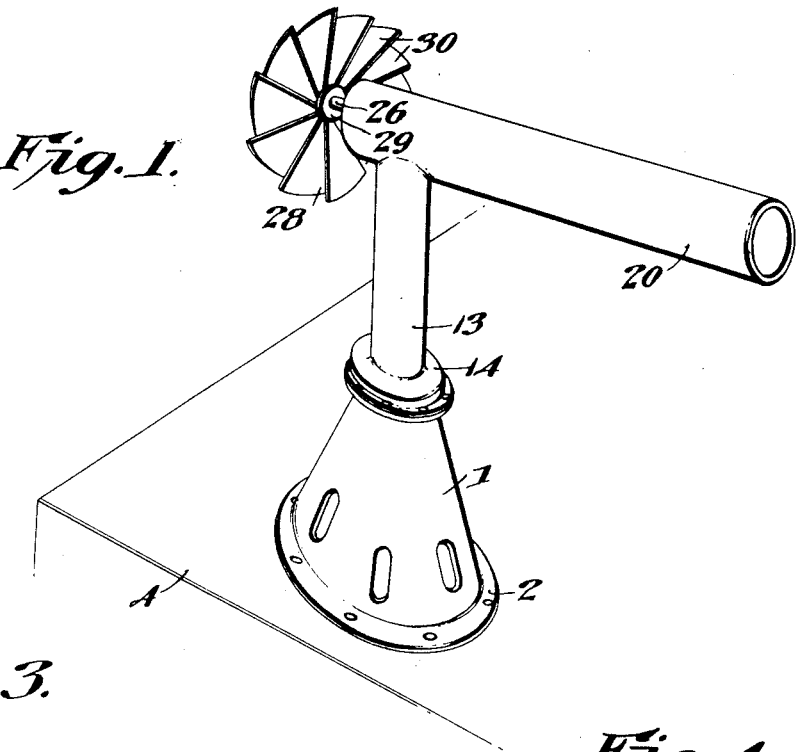
Figure 1 is a view in perspective illustrating an adaptation of my invention mounted for use.
Figure 3:
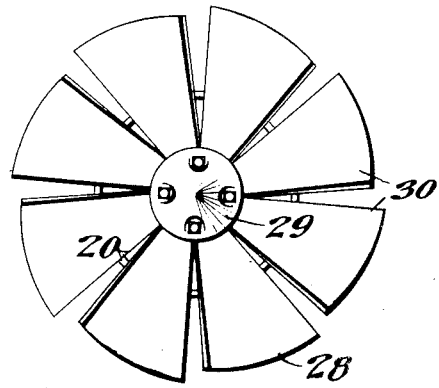
Fig. 3 is a view in front elevation of the air wheel or windmill.
Figure 4:
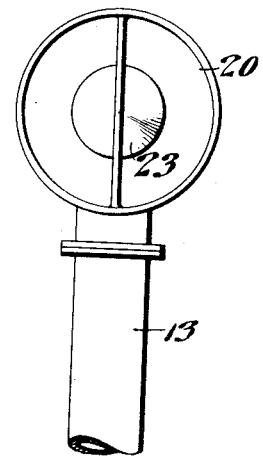
Fig. 4 is a fragmentary view in end elevation to better show the construction of the air tube.

A supporting casing 1, which is preferably of sheet metal or light cast material to thus keep the weight at a minimum consistent with the required strength, is made to be of truncated cone shape and has a mounting flange 2 provided at its widened base to receive bolts 3, or other suitable fastenings, by which the power unit is mounted and secured in place upon the roof of a building, or upon any other suitable support 4, substantially as illustrated in Figure 1.

Supporting frames 5 and 6 are secured as spreaders within the upper portion of the supporting standard 1 in suitably spaced relation, and if desired additional brace members 7 can be secured between these supporting frames 5 and 6 to increase the rigidity of the parts of the mounting.

The supporting frames 5 and 6 have vertically aligned openings 8 formed centrally therethrough and a mounting tube 9 is secured in these openings, with its upward end extending above the supporting standard structure 1 and widened out or flanged at 10 to support the ball races 11 and 12. A supporting tube 13 has a bell-shaped housing 14 provided at its lower end and made sufficiently large to fit down over and to clear the flange portion 10 of the mounting tube 9. A ring-shaped cover plate is provided to close the open end of the bell-shaped casing 14 around the mounting tube 9, and this ring cover has a central opening sufficiently large to clear freely the mounting tube 9. Ball races 16 and 17 are provided within the casing 14 to mate with the ball races 11 and 12, and ball bearings 18 and 19 are provided to complete an anti-friction pivotal mounting by which the supporting tube 13 is held in vertically aligned relation with the mounting tube 9, and is free to turn upon its axis through application of the slightest force.

The air or wind tube 20 is rigidly mounted at the upper end of the supporting tube 13, this mounting being so accomplished that the air or wind tube is supported with its axial line substantially centered above the axial line of the supporting tube and with the major portion of its length extending substantially horizontally on one side of the supporting tube. This air or wind tube 20 is preferably made to be of cylindrical form, or circular in cross section, and of sufficient diameter to present a considerable opening at its forward end, which is the end positioned over the upper end of the supporting tube 13.

A bearing sleeve 23 is mounted at the forward end 22 of the tube 20 by means of cross members 24, or other suitable supporting means that will rigidly carry the sleeve 23 substantially centrally within the tube 20 without restricting the air passage or opening around the sleeve. This sleeve 23 extends forwardly and is provided with a sufficient number of suitable ball, or other anti-friction bearings, 25, to mount the shaft 26 therein to turn freely on an axis substantially in line with the central axis of the tube 20. The sleeve 23 has its rear end, as projecting into the tube 20, tapered to be of substantially conical form, or otherwise reduced to cooperate with the formation of the air or wind tube 20 to form a Venturi throat and construction at 27.

An air wheel or windmill 28 is mounted on the outer end of shaft 26, and this air wheel has the forward end of the shaft 29 preferably tapered or made of cone-shaped form to decrease resistance and direct air blowing against the wheel outwardly through the vanes of blades 30.

The shaft 26 is preferably provided with an operating crank 31, and a pitman rod 32 is provided to transmit power impulses from this crank 31 as the shaft 26 is rotated.

Within the supporting standard 1 an air pump 33, of the reciprocating piston type is provided, this pump having an intake at 34 and an outlet through which compressed air is conducted, at 35. The pitman rod 32 is preferably joined with the piston 36 through a ball connection 37. Suitable oil caps or other lubricating means can be provided for the shaft 26 and the pump 33, as shown, and it will be understood that the antifriction ball mounting between the mounting tube 9 and the supporting tube 13 can be lubricated in any suitable and well known manner.

To increase the efficiency and make this unit available for use in substantially any mounting and under substantially all conditions, the various operating parts will be constructed to keep friction losses at a minimum, and the pump 33 will preferably have a short stroke to thus help in maintaining a consistent high speed of rotation of the air wheel or windmill and consequently the shaft 26. The various parts can be made of aluminum or other suitable material to reduce the weight to a minimum, and hand holes or openings 38 can be provided through the supporting standard 1 to still further reduce the weight, and to at the same time permit access to be had to the pump 33.

This unit and the air pump are employed in supplying compressed air for service stations and the like. The compressed air pipe 35 leads to air storage tank 39, or some other suitable air container. This tank 39 can be provided with a compressed air discharge and supply pipe 40, to which can be connected a tire inflating hose, or the like. It is perhaps preferable that a safety valve 41, or other safety check means be provided to guard aginst over pressure within the tank 39, and suitable valves or other control means can be provided in both a line to and from the tank 39 or either of these. Further, one or more additional reserve air storage tanks or containers might be employed.

Where a constant supply of air under pressure is required and the location is such that the air currents or wind cannot be depended upon at all times it may be found desirable to employ an arrangement such as suggested in Fig. 5, and here the shaft 26 is extended and is connected to be rotated by a motor 42, or other suitable power unit. This motor 42 will be connected to receive current from the electric circuit 43, supplied from a battery 44, or other suitable source. Under some circumstances it may be desirable to construct the unit 42 as a generator, or as a combination motor-generator, and then when the shaft 26 is turned by the air wheel or windmill 28, current will be generated to be stored in battery 44, or the like.

With the wind tube 20 open at its trailing end and slightly constricted at its forward end 22, 21 and the venturi formed at 27 will increase air current velocity affecting air wheel or windmill 28, and the shaft 26 will consequently be rotated even under the slightest breeze or movement of air currents. As the supporting tube 13 is associated with the mounting tube 9, the slightest pressure of air currents will cause the wind tube 20 to swing supporting tube 13 so that the air wheel or windmill 28 will face directly in the wind or air current, and this also faces the leading end 22 of the wind tube direct into the wind to thus take full advantage of the Venturi action to increase the velocity and consequently the operating force of the air currents. The hub 29 serves to direct the full volume of air striking the fan front of the air wheel outwardly by driving and impelling the air wheel with the blades or vanes, and the venturi, contact with the blades or vanes, and the venturi, in addition to increasing the velocity, extends to hold these air currents in a line coinciding with the axis of rotation of the air wheel, to thus give maximum driving force.

While I have herein shown and described only certain specific embodiments of my invention, and have suggested only certain possible modifications and changes in the construction, mounting and use of the parts and of the unit as an entirety, it will be appreciated that many changes and variations can be made in the form, construction and arrangement of the parts; that, positive power and current generating units can be mounted and connected to operate in other manners than here shown; and, that other changes can be made to suit different requirements of use, without departing from the spirit and scope of my invention.

I claim:

1. An air operated power unit comprising, a swingable support, a wind wheel carried by said support and rotatable on a substantially horizontal axis, and a wind tube carried by said support trailing behind and substantially in line with the axis of rotation of said wind wheel and provided with a venturi.

2. An air operated power unit comprising, a support swingable upon a substantially vertical axis, a wind wheel carried by said support at one side and rotatable on a substantially horizontal axis, and a substantially cylindrical wind tube carried by the support with one end opening concentrically substantially in the rear of said wind wheel and the other end open and trailing, said tube having an extension in line with the hub of the wheel disposed as a venturi.

3. An air operated power unit comprising, a support swingable upon a substantially vertical axis, an elongated cylindrical wind tube mounted upon said support at one end with its other end extending substantially horizontally, a bearing sleeve support substantially centrally within the mounted end of the wind tube and spaced from the inner wall thereof, said bearing sleeve being constricted at its inner end to form with the wind tube a venturi, and a wind wheel mounted in said bearing sleeve to rotate in advance of the venturi.

4. An air operated power unit comprising, a supporting and mounting standard, a supporting tube carried by said standard and readily revoluble on a substantially vertical axis, a cylindrical wind tube mounted in substantially horizontal relation upon said supporting tube at one of its ends forming a leading end and with its other end extending substantially radially as a trailing end, a bearing sleeve of less diameter than said wind tube mounted centrally within the leading end thereof and reduced at its inner portion to form a venturi within the leading end of the wind tube, a shaft revoluble in said bearing sleeve, a wind wheel mounted on the forward end of said shaft in advance of the leading end of said wind tube, a unit to which power is to be transmitted located substantially in line with the supporting tube, and a power driving connection accomplished through said supporting tube.

5. An air operated power unit comprising, with a swingable support, a wind wheel carried by said support rotatable on a substantially horizontal axis, a wind tube carried by said support trailing behind and substantially in line with the axis of rotation of said wind wheel, and a unit operatively connected with said wind wheel to operate simultaneously therewith and located within the wind tube to restrict the opening therethrough in its middle portion.

6. An air operated power unit comprising, a support swingable upon a substantially vertical axis, a substantially cylindrical wind tube mounted at one of its ends upon said swingable support and disposed substantially horizontally, with its other end trailing laterally, a shaft revolubly mounted in the forward end of said wind tube, a wind wheel mounted on said shaft, and an electric unit associated with said shaft and located within the tube to restrict the opening therethrough in its middle portion.

7. An air operated power unit comprising, a supporting standard of substantially truncated cone shape, a unit to be operatively associated with said supporting standard, a mounting tube carried by said standard and opening adjacent to said unit to be operated, a supporting tube carried by said mounting tube and freely rotatable on a substantially vertical axis, a wind tube of cylindrical form mounted at one of its ends on the upper end of said supporting tube and disposed in substantially horizontal position with said end swinging forwardly into the wind as a leading end and the other end trailing laterally, a bearing sleeve mounted concentrically within the leading end of said wind tube with its inner portion reduced to form a venturi in the leading end of the tube, a shaft rotatable in said bearing sleeve, a wind wheel on the outer end of said shaft, and a driving connection from said shaft through the supporting and mounting tubes to the unit to be operated.

8. An air-operated power unit comprising, a supporting and mounting standard, a tubular supporting housing, a tubular housing carried by said standard provided with a flange at its upper end, flanges on the tubular supporting housing interfitting with the flanges on the housing member carried by the supporting standard to revolubly mount the tubular supporting housing to be capable of free rotation upon a vertical axis and to be held against vertical and lateral twisting movement, a substantially cylindrical wind tube mounted in substantially horizontal relation upon the upper end of said supporting housing tube to extend laterally on one side, a bearing structure of less diameter than said wind tube mounted centrally within the leading end thereof and reduced at its inner end to form a venturi within the leading end of the wind tube, a shaft revoluble in said bearing sleeve, a wind wheel mounted on the forward end of said shaft in advance of the leading end of said wind tube, a unit to which power is to be transmitted located substantially in line with the supporting tubular housing, and a power transmission connection from said shaft to the unit accomplished through the supporting housing tube.

PALMER H. CRARY.